Dec. 28, 1965 F. B. SIKORSKI ETAL 3,226,488

DATA SWITCHING SYSTEM

Filed Dec. 12, 1962 9 Sheets-Sheet 1

INVENTORS
Frank B. Sikorski
Kore K. Spellnes

BY C. A. Gulbrandsen
ATTY.

Dec. 28, 1965 F. B. SIKORSKI ET AL 3,226,488

DATA SWITCHING SYSTEM

Filed Dec. 12, 1962

9 Sheets-Sheet 2

INVENTORS
Frank B. Sikorski
Kore K. Spellnes

BY C. A. Gulbrandsen

ATTY.

Dec. 28, 1965 F. B. SIKORSKI ETAL 3,226,488

DATA SWITCHING SYSTEM

Filed Dec. 12, 1962 9 Sheets-Sheet 3

INVENTORS
Frank B. Sikorski
Kore K. Spellnes
BY C. A. Gulbrandsen
ATTY.

INVENTORS
Frank B. Sikorski
Kore K. Spellnes
BY C. A. Gulbrandsen
ATTY.

INVENTORS
Frank B. Sikorski
Kore K. Spellnes
BY
C. A. Gulbrandsen
ATTY.

Dec. 28, 1965 F. B. SIKORSKI ETAL 3,226,488

DATA SWITCHING SYSTEM

Filed Dec. 12, 1962 9 Sheets-Sheet 6

INVENTORS
Frank B. Sikorski
Kore K. Spellnes
BY
C. A. Gulbrandsen
ATTY.

Dec. 28, 1965 F. B. SIKORSKI ETAL 3,226,488

DATA SWITCHING SYSTEM

Filed Dec. 12, 1962 9 Sheets-Sheet 7

INVENTORS
Frank B. Sikorski
Kore K. Spellnes
BY
C. A. Gulbrandsen
ATTY.

INVENTORS
Frank B. Sikorski
Kore K. Spellnes
BY
C. A. Gulbrandsen
ATTY.

DATA SWITCHING SYSTEM

Filed Dec. 12, 1962

INVENTORS
Frank B. Sikorski
Kore K. Spellnes
BY C. A. Gulbrandsen
ATTY.

United States Patent Office 3,226,488
Patented Dec. 28, 1965

3,226,488

DATA SWITCHING SYSTEM

Frank B. Sikorski, Des Plaines, and Kore K. Spellnes, Glen Ellyn, Ill., assignors to Automatic Electric Laboratories Inc., Northlake, Ill., a corporation of Delaware Filed Dec. 12, 1962, Ser. No. 244,058
4 Claims. (Cl. 179—18)

This invention relates to a link-access selective switching system, being concerned more particularly with a system of the character arranged and adapted for interconnecting a number of data communication lines, having a frequency range capability of up to 15 times the 0–4000 c.p.s. range normally used in telephone system, individually with each other in any desired pairings as indicated by the digits of the received number. Interline link paths sufficient in number that no desired connection between lines can be blocked for the lack of an idle link path is provided for trunk lines. Local lines can be provided any degree of link trunking up to full non-blocking service at the discretion of the operating company with no changes in the control equipment.

Because of the requirement for both the usual percentage trunking provisions for some of the lines in the system and of non-blocking trunking for others of the lines served, as well as the broad-frequency band for each switched channel many new and unique problems had to be solved to make such a system possible.

The problems encountered in telephone systems from delay distortion, crosstalk, noise, etc., take on greater meaning when applied to a high-frequency switching system. While these difficulties are encountered in private systems, overcoming them in a commercial switched network is essentially a new problem.

Accordingly it is a primary object of the present invention to provide a data transmission communication system with capabilities of handling high speed data as well as the means for selectively connecting stations of the system to each other.

Another object of this invention is to expedite, and generally improve data transmission in a communication system.

Another object is to provide a new and improved data switching system.

The overall network consists of a nationwide microwave system that spans the nation and connects all major cities on a switched basis. Data, in all forms, is conveyed over this network by means ranging from 2 kilocycle low-speed, narrow-band circuits to 48 kilocycle high-speed, wide-band circuits. All of these channels are on a switched, call-up basis. Both digital and analog signals can be accommodated.

The switching center connected to this network is similar in many respects to the cross-bar common control, however, it utilizes a high speed dry reed cross-point matrix. Two matrices composed of such dry reed switches are used in a switchboard, a line group matrix and a register matrix. Each unit is built up from an array of crosspoints in a manner such as to make possible a non-blocking interconnection for tandem traffic. It is also possible to provide for a reasonable small congestion in connection with originating and terminating traffic to local lines. The degree of congestion or grade of service may be varied. The matrices are constructed in stages whereby they may be easily expandable in groups of ten lines.

The register matrix stage provides for connection between incoming trunks or originating lines to either a dial pulse register or a multi-frequency register. The registers are connected to senders and translating equipment for proper handling of the traffic.

The line group matrix has three stages and interconnects calling line or trunk circuits to called circuits. The first or A stage is a reducing stage for lines in that it has in a typical office, 100 input circuits and only 19 outputs. The B stage of the line matrix is capable of switching any one of the 19 A stage outlets to any one of the 19 C stage inputs. The C stage takes 19 inputs and expands them to 100 outlets to line circuits.

Another, slightly different, line matrix unit which handles trunks is also provided. The A stage expands 10 trunk inputs to 19 outlets, with the C stage just reversed, and is therefore non-blocking on tandem calls.

The terminating equipment is similar in some respects to line and trunk circuits previously designed for telephone systems. However, new features have been added to incorporate the extreme frequency and noise limitations. Every transmission terminating circuit has two distinct parts, a control circuit and a transmission path switching circuit. The split control and transmission parts of a circuit are also evident in the connector circuit which provides for the signalling of the called line.

The marker for this system is divided into two segments, an originating marker and a terminating marker. The originating marker controls the operation of the register matrix and the terminating marker controls the operation of the line stage.

The register-sender is associated with every incoming line or trunk call. Both dial pulse and multi-frequency receiving types are provided. The register marker determines the appropriaate register-sender for the calling line and connects it to the line through the register matrix. The marker supplies the calling line identity and class to the register and then releases. The register returns dial tone to the calling party or a start-send signal to incoming trunks.

The register-sender accepts the dial pulsed or multi-frequency sent digits, which it with the aid of an associated translator process for connection to the requested terminal station. The register-sender will, after the terminating marker has extended the call to the indicated terminal within the office, outpulse the required digits and then release itself. On a locally originated call a ticketer will be called in for transfer thereto of the accumulated data pertinent to the call for billing purposes. For purposes of implementing this disclosure of the register sender and marker the disclosure of Patent No. 3,007,006 may be used.

The translator for the broadband switching system must fulfill a set of requirements for a new and hitherto unavailable type of switched communication service. The salient features of this new service are variable bandwidth communication with the bandwidth used to be selected by the subscriber on each call, and a "repertory dialing" service, permitting frequently called stations to be dialed by an abbreviated address code.

A ticketer circuit is included in each locally originated connection to accumulate the data for billing.

A connector circuit is included in each locally terminated connection to ring the called party and to supervise the connection.

In the exemplary embodiment set forth herein the cross-point relays are so-called reed relays wherein the contacts are sealed in glass envelopes with the relay winding wound around all of the envelopes of the contacts comprising the relay. A typical reed type relay is disclosed in the following copending application of George S. Lychyk and Arvo Taliste filed July 28, 1961, Serial No. 127,648, while the matrix arrangements of these relays are disclosed in the copending application of Peter K. Gerlach, George J. David and Rudolph O. Stoehr filed August 21, 1961, Serial No. 132,897.

According to the invention, all trunk line-switching groups contain the same number of lines, and each link of any trunk line-switching group extends to a separate link-switching group which can effect any desired connections between links thereof, no blocking can occur for the lack of an available idle link path if the number of links for each switching group is one less than twice the number of lines in a switching group. For the example herein illustrated, where each trunk line-switching group comprises ten trunks, nineteen switching links per switching group provide completely non-blocking service for the interconnection of the communication channels of the data processing or computing systems.

The invention has been disclosed as embodied in a typical multi-group situation wherein separate communication connections are made on a non-blocking link-access basis from desired trunk lines of one group to trunk lines of another group, and wherein local line connections are made on a partial blocking basis with other local lines.

A feature of the invention is the use in an economical form, of a previously suggested non-blocking link-access switching plan, such as is proposed in the article "A Study of Non-Blocking Switching Networks," by Charles Clos, Bell System Technical Journal, March 1953, pages 406 to 424, and referred to in the article, "Analysis of Switching Networks," by C. Y. Lee, same publication, November 1955, pages 1287 to 1315.

Another feature of the invention relates to a simple diode with each of the crosspoint electromagnets. The diode is connected in the circuit of one of the windings of the magnet and is employed to transmit the marking condition from a marked terminal to an intermediate point.

Another feature of the invention relates to the simple circuit configuration of placing all of the hold windings at each crosspoint in a multi-stage network in series.

Another feature of the invention relates to the use of a separate matrix for connection of a calling subscriber equipment to the common control register group circuits, upon initiation of a call.

The foregoing and other objects and features of this invention and the manner of attaining them will become more apparent and the invention will best be understood, by reference to the following description of an embodiment of the invention taken in conjunction with the accompanying drawings, comprising FIGS. 1 to 11, wherein.

*General*

Figure 1:
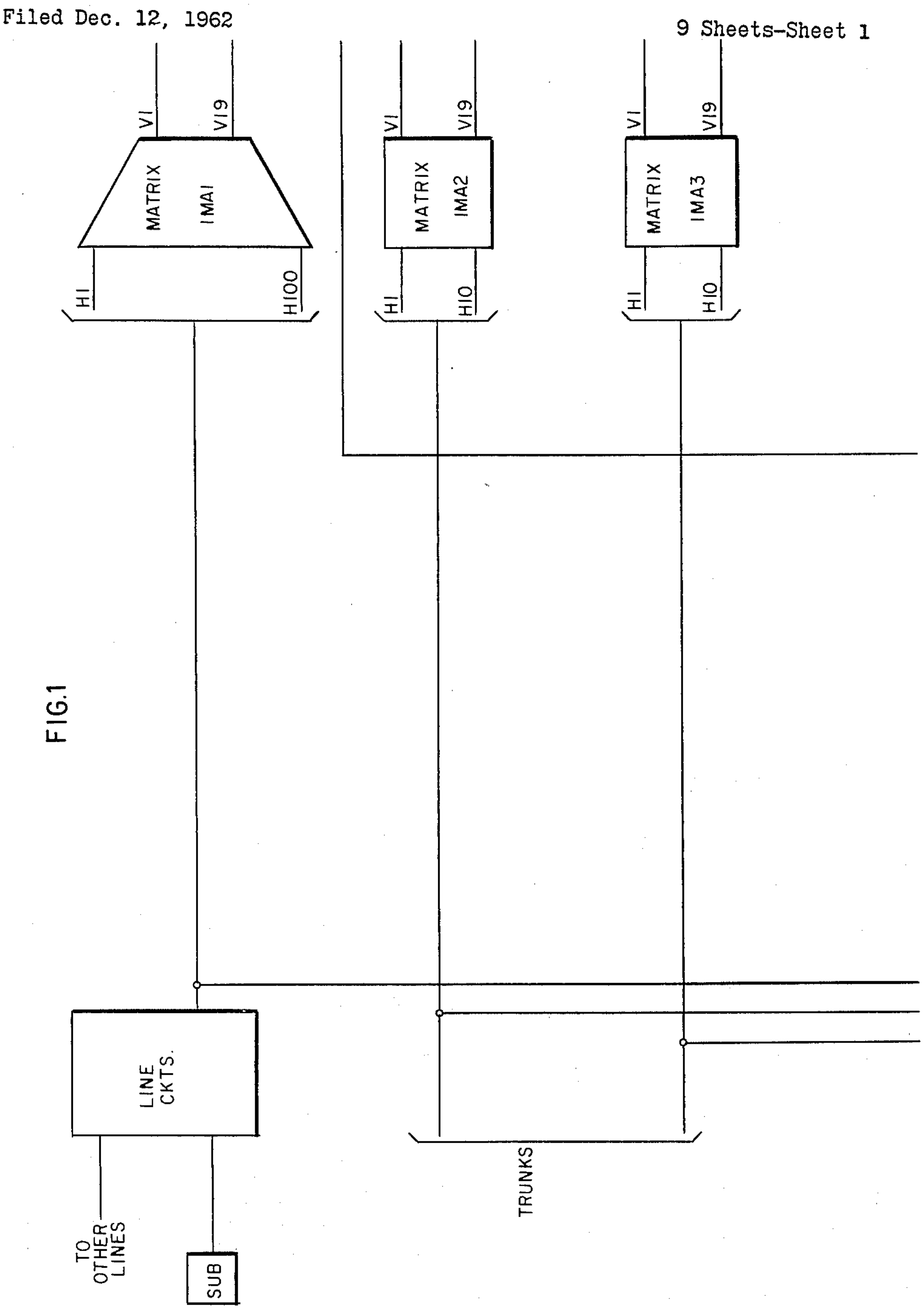
FIGS. 1 to 4 show an overall diagram of a three-stage switching system according to the invention for interconnecting, on a combined partial blocking and non-blocking basis of 120 lines in any desired line-to-line interconnection, together with a block diagram of the associated control and supervisory apparatus.

A subscriber lifts his handset and seizes the control relays in his particular line circuit FIG. 1; these relays call the originating marker in to set up the connection through the register matrix 3AR1–3AR12. The call passes through a repeating coil, past line termination resistors, through reed capsules into a register either 3RSF or 3RSD, at which point dial tone is applied to the line. The routing is received from the common control equipment including the translator 3TR, as is also the connection setup through the line matrix consisting of its "A" stages 2MA1–2MA3, the "B" stages 2MB1–2MB3 and the "C" stages 2MC1–2MC3 with the aid of the marker shown on FIG. 4. The final connection is through the A stage, past a ticketer 2T1–2T19 for a locally originated call which records the time, and then over switching B stage reed capsules. A momentary delay at the connectors 2C1–

2C19 switching reed capsules, is encountered, while control relays ring the called station. As the called party answers, switch through and a high speed run to the called party's line circuit quickly completes the connection. The brief stop at the connector enables the calling party to talk with the called party. Change over to data transmission is under the complete control of the two parties.

In the A stage of the line matrix, since only 19 of the 20 outlets are used, the call could have been routed to an all trunks busy tone via the 20th outlet.

DESCRITPTION

*Termination equiment*

The basic line circuit used in broadband has the following functions: initiate the start action to the orginating marker at start of call; provide direct current simplex line supervision and pulsing, if dial pulsing is used, to a subscriber station over four-wire transmission path; provide termination on idle lines; prevent switch through of calling line to line matrix till path setup is complete; provide single frequency signaling options as required; provide line lockout; and provide off-hook supervision over extra control lead.

Figure 5:
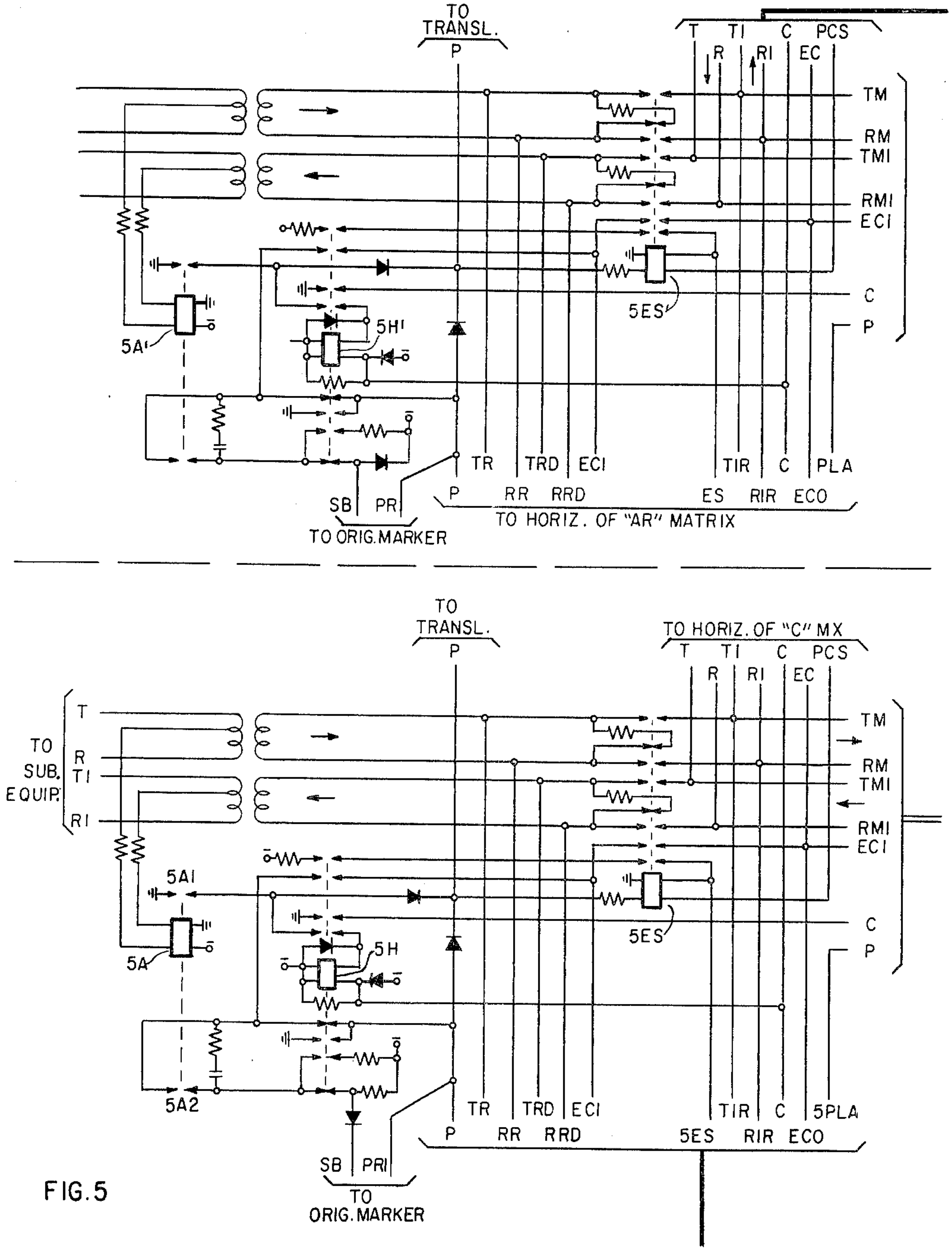
FIGS. 5 to 9 show in greater detail the line circuit and crosspoint line matrix and register matrix components included in a single station-to-station connection.

This line circuit is universally used by all subscribers having up to 16 kc./ps. data or voice transmission equipment and is shown in FIG. 5. It is broken into two parts, as for example in the calling line shown in the lower portion of FIG. 5, the calling line components carry the same designations followed by a prime mark, the control relays 5A and 5H and the transmission switch through relay 5ES, to eliminate possible sources of noise. Most of the control leads through the line matrix either originate or terminate in the line circuits; calling party release holding and high to low resistance on-hook to off-hook supervision are sent via control leads, hold lead 5ES and extra control lead EC1 respectively from these circuits.

An interesting subscriber feature is the 48 kc./ps. line circuit, provided with the highest frequency facility available. A subscriber using this facility has two sets of four-wires coming to his premises; one may be termed the high frequency set and the other the order wire. To originate a call, a subscriber uses the order wire, that is for key or dial pulsing or talking to the called party. After setting up the call and switching to the data mode of operation, the subscriber may transmit high speed data over the high frequency facility and may transmit either low speed data or voice over the order wire.

Since all transmission circuits through the line matrix are only four wires each, some method of mixing the high frequency and order wire signals is necessary. This is accomplished by using a high frequency filter which passes high frequency signals to the data set of four-wires and a low frequency filter which passes low frequency signals to the order wire. Of course the filters block all unwanted signals from either set of wires.

In the trunks both 16 kc./ps. and the 48 kc./ps. circuits provide similar features of the line circuits plus the additional two-way guarding features required. The data link and the order wire are again split for inter-office trunking as in the 48 kc. line circuit.

*General matrix system concept*

The broadbank matrix is constructed with basic building blocks, combining them, and forming the total system. The basic building block consists of a six make contact dry reed switch. Fifty such devices plug into a printed circuit card, giving a matrix suitable to interconnect any one of 10 input circuits to any one of five output circuits. This matrix card is interwired with other similar cards to provide the switching matrices of the exchange.

MATRIX

The reed capsule which consists of movable springs of magnetic material is enclosed in a hermetically sealed glass capsule. The springs are plated with a precious metal, usually gold alloy, at the area of spring overlap providing the desired electrical contact when the reed capsule is magnetically actuated. The reed capsule improves the life characteristics of a pair of switching contacts by providing a favorable operating environment.

Six of the reed capsules are inserted into a molded bobbin which is the basic frame. The bobbin gives form to the coil windings, supports a diode which is part of the matrix circuitry, and holds printed circuit terminals for plug-in mounting in a printed circuit card. The size of this six-reed capsule unit is approximately seven cubic inches.

Because of gold plated contacts, low contact resistance is achieved, and due to the glass capsule enclosure high open circuit resistance is obtained. The open circuit to the closed circuit resistance ratio is normally in excess of a million million times. Because the coil surrounds the reed contacts, a low noise pickup and cross talk level are realized and also since the reeds are light in weight and have low inertia, very high speed operation results. Typically, operate or connect time is less than three milliseconds and release or disconnect time less than one millisecond.

Fifty such crosspoints are plugged into and soldered to a two-layer printed circuit card approximately 8½ inches by 16 inches. The top layer of printed wiring comprises the vertical matrix connections and the bottom layer closest to the card is for the horizontal interconnections. The two wiring layers are separated by a thin mylar film, and all layers are bonded to the printed circuit card. Around the periphery of the card, are 300 wire-wrap terminals arranged in groups of ten per circuit. An aluminum frame provides support to the unit.

In the entire switching system, only a single matrix card is used with three variations in the coil windings of the crosspoints.

Figure 6:
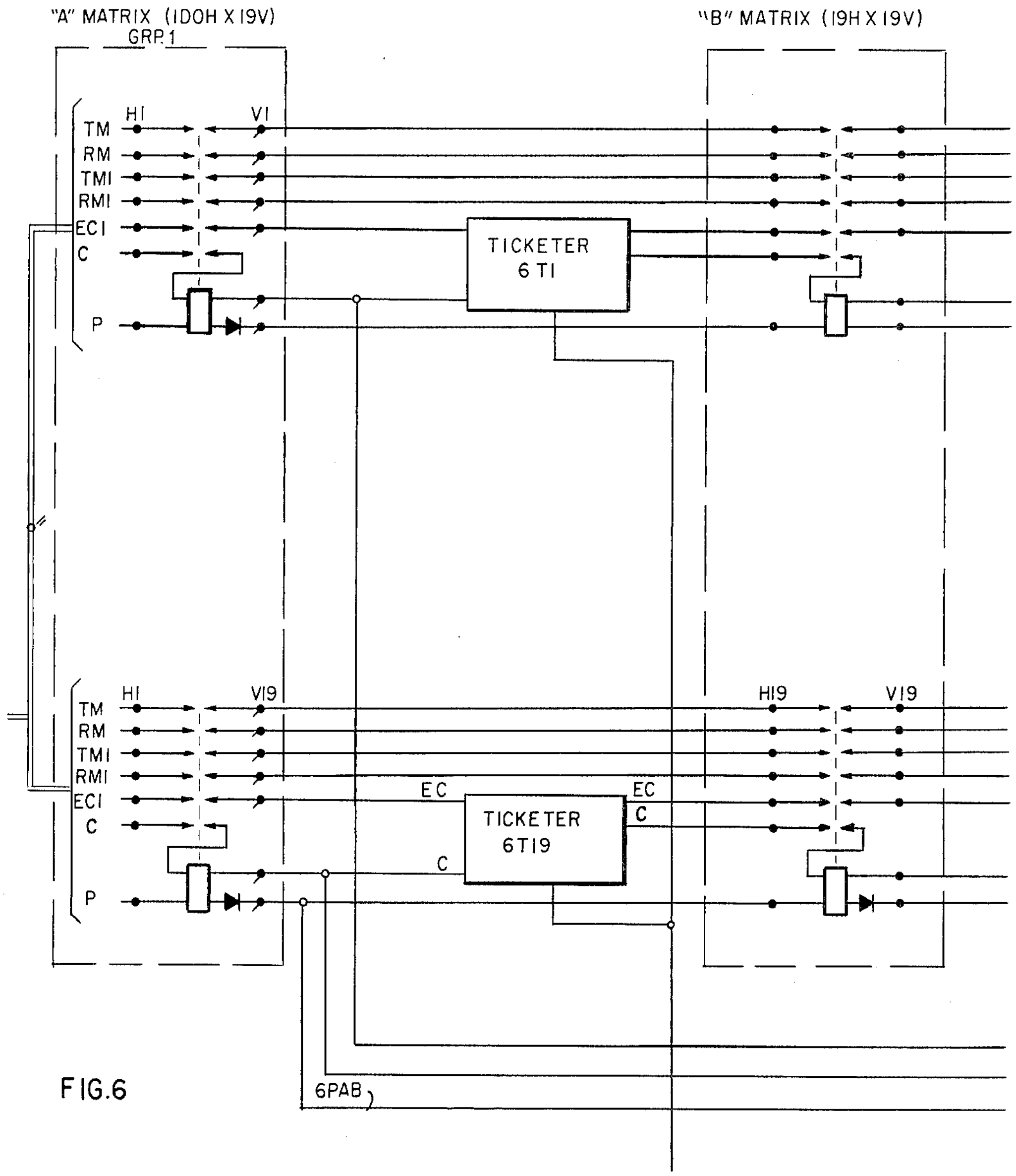

The operation of a crosspoint matrix may be studied in FIGURE 6 of the "A" matrix, by applying a negative potential to the vertical P or pull lead and a ground to a horizontal P lead; a unique crosspoint coil may be energized. As the reed capsule contact is activated, a holding path is established through the operated contact and a second winding of the coil via the "C" lead. Five more leads and contacts per crosspoint are extended through the matrix. These leads handle the four-wire transmit and receive transmission path and an extra control lead. The diodes in series with the pull winding of each coil prevent more than one crosspoint from operating, when the pull potential is applied.

If several FIGURES 6 were side by side, and the vertical input of the second connected to the horizontal output of the first, more than one crosspoint may be operated in series, to provide several stages of switching. Actually, two stages of unique crosspoints may be pulled in series. Thus by using combinations of the basic matrix card, any size matrix stage having $n$ inputs and $m$ outputs can be constructed. If 50 cards are wired in series horizontally, the result is a single matrix switching stage having one thousand input circuits and five output circuits.

In the broadband system, two matrix switching units are used. The first matrix is a single stage, similar to the previous example, that connects calling line circuits to register-senders. The first stage, or A stage of the register-sender connect matrix, termed AR matrix shown in FIG. 8, may connect as many as 1000 line or trunk circuits to 5 registers. However, due to the large number of information leads which must be connected, two crosspoints are operated in parallel. These crosspoints are held only while a register is in operation or being used, and are operated by the originating marker.

Figure 2:
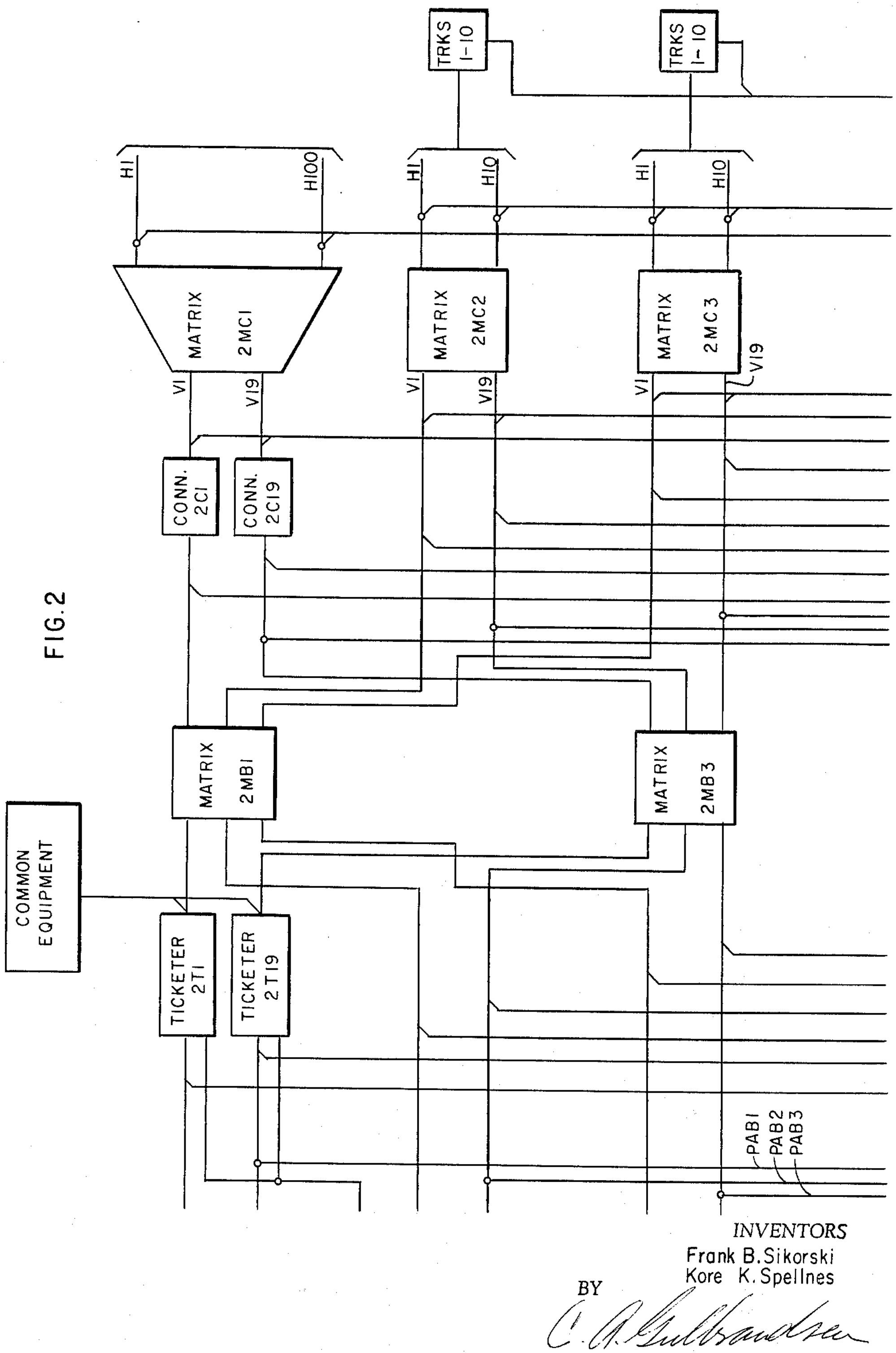

The second or line matrix is composed of two parts having three stages and interconnects calling line or trunk circuits to called circuits as shown in FIGURES 1 and 2. The first or A stage is a reducing stage for lines in that it has 100 input circuits and only 19 outputs, the twentieth output path is utilized for sending special tones back to the calling station. Trunking calculations were made assuming 1.5 calls per busy hour, an average holding time 3.5 minutes per call and a grade of service of 1/1000 for the example shown.

The B stage of the line matrix is capable of switching any one of the 19 A stage outlets to any one of 19 C stage inputs. The C stage takes 19 inputs and expands them to 100 outlets to line circuits.

The second part of the line matrix has two slightly different line matrix units which handle trunks and special services. Both access the same B stage just described but have different size A and C stages. The trunk A stage expands 10 trunk inputs to 19 outlets with the C stage just reversed, and is therefore non-blocking on tandem calls.

To construct the A stage of the line matrix, assuming 100 lines in the total system, all that is necessary is to interwire 10 cards in series horizontally by 4 cards in series vertically using a total of 40 cards. The C stage would be the mirror image of the A stage and would also require 40 cards.

The B stage, however, is more complex to construct. If only one A stage subgroup of 100 lines plus 19 outlets is used, a switching B stage of only one crosspoint per A stage outlet is required, and this is superfluous. Now, if there is more than one A stage subgroup, a switching B stage matrix will take form and will have as many inputs as subgroups. In fact, the B stage will consist of 19 square matrix units, with the size of each square determined by the number of subgroups.

Figure 7:
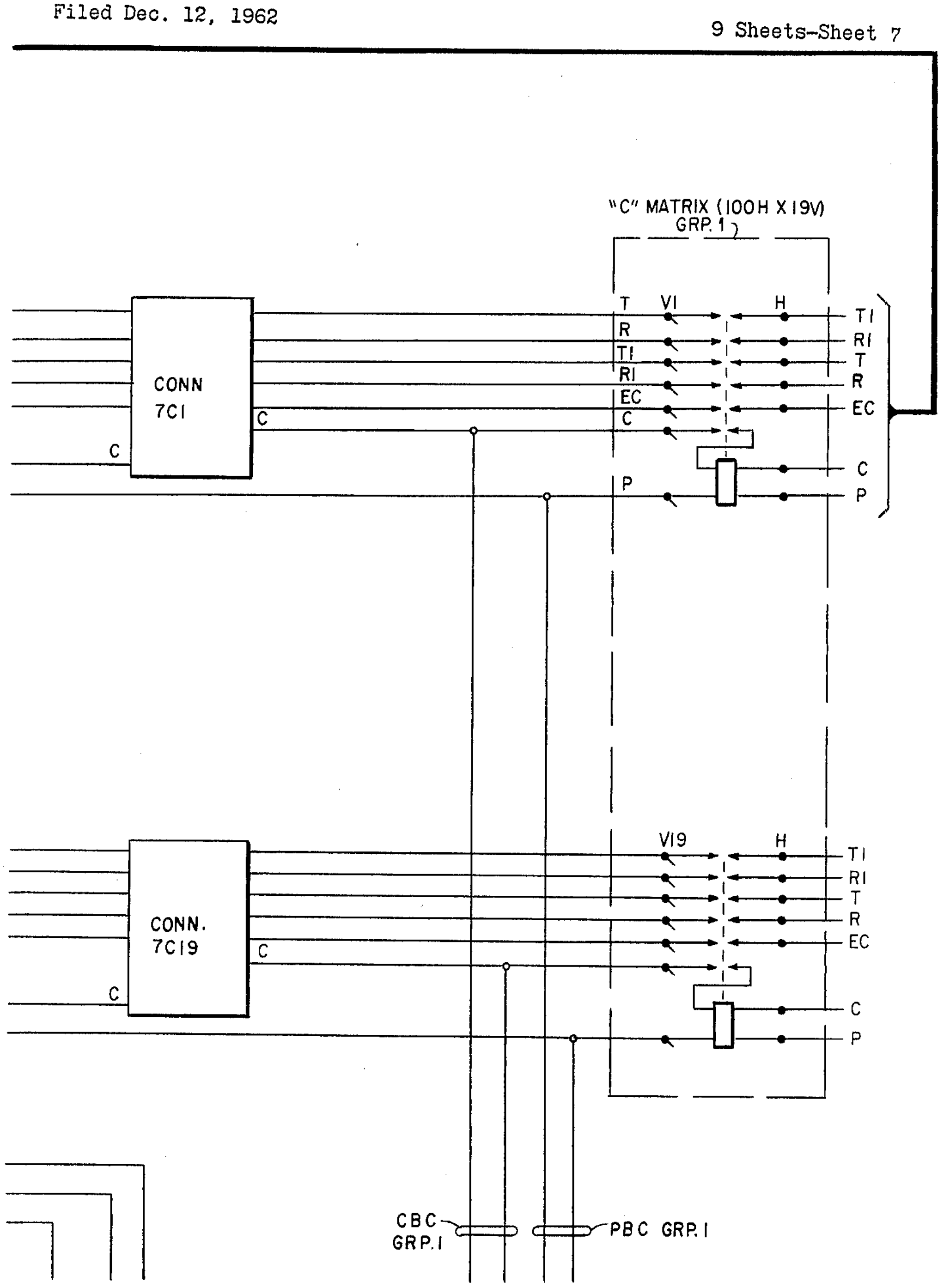

For example: for a 1000 line office, there would be 10 subgroups of 100 lines each to the A stage or 10 subgroups of 19 links from the A to the B stage. The B switching stage would then contain 19 square matrix arrays each with 10 inputs and 10 outputs. This requires a total of 2 cards, connected in series vertically, per array or 38 cards for the B stage. Operating and holding paths for the line matrix are shown in FIGURES 5, 6 and 7.

A typical broadband office might consist of 200 lines, 50 trunks and 15 special service trunks or a total of 8 subgroups. This would require approximately two hundred fifty-four cards for the line matrix, fifty-four cards for the register matrix and a total of 15,400 crosspoints for this hypothetical switching center.

*Originating marker operation*

Figure 3:
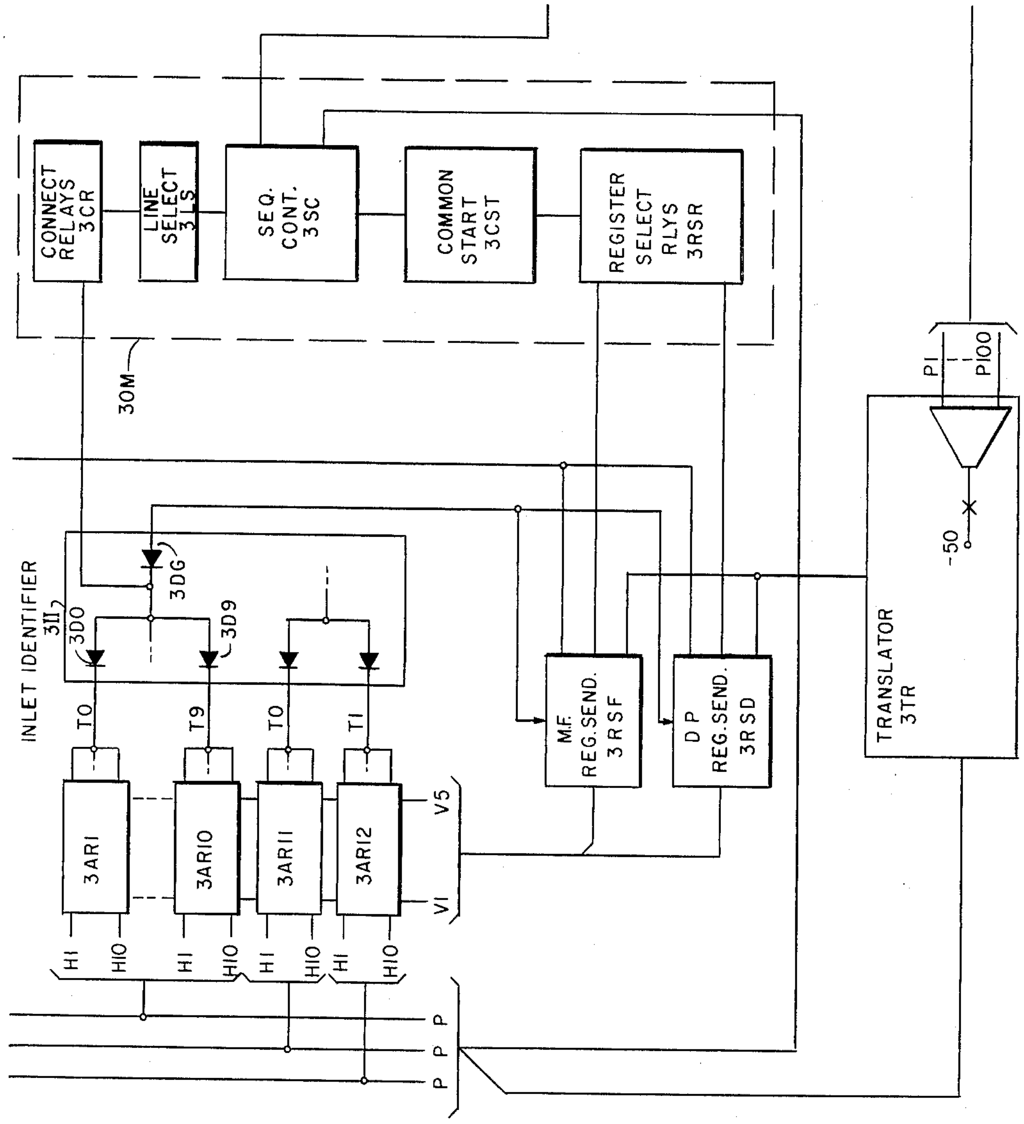

FIGURE 3 illustrates the originating marker 30M in block form. The marker common start circuit 3CST, marker sequence control circuit 3SC, and the line select relays 3LS will serve a maximum of 1000 lines or trunks. The register-select relays 3RSR, the 100-line-tree 3LT, and the connect relays 3CR are provided in accordance with the number of lines, trunks, and registers that are equipped in a particular office.

In order to close a line requesting service through to a register via the register matrix 3AR1–3AR12, it is necessary to specifically identify this line so that the pull potential may be applied to the correct correed relays in the matrix. A diode tree 3D0–3D9 is used to close the start signals through to the line-select relays 3LS, which then select the line to be served. As the line requesting service is completely identified by the line-select relays, it is able to provide the line identify for ticketing purposes to the register, which stores it until the information is needed by the ticketer serving the call.

Simultaneous with the line-selection process, the register-select relays 3RSR hunt an idle register. As ultimately, the use of two types of registers will be required (multi-frequency or dial pulse receiving), the register-select relays 3RSR are arranged to hunt for either type of register as directed by the marker-sequence control circuit 3SC.

When line selection is completed and an idle register has been selected, the calling line equipment number and the classification of the originating party as to line or trunk is furnished to the register. When the register acknowledges receipt of this information, the pull potential is supplied to the matrix relays and the calling party is connected to the register.

Figure 4:
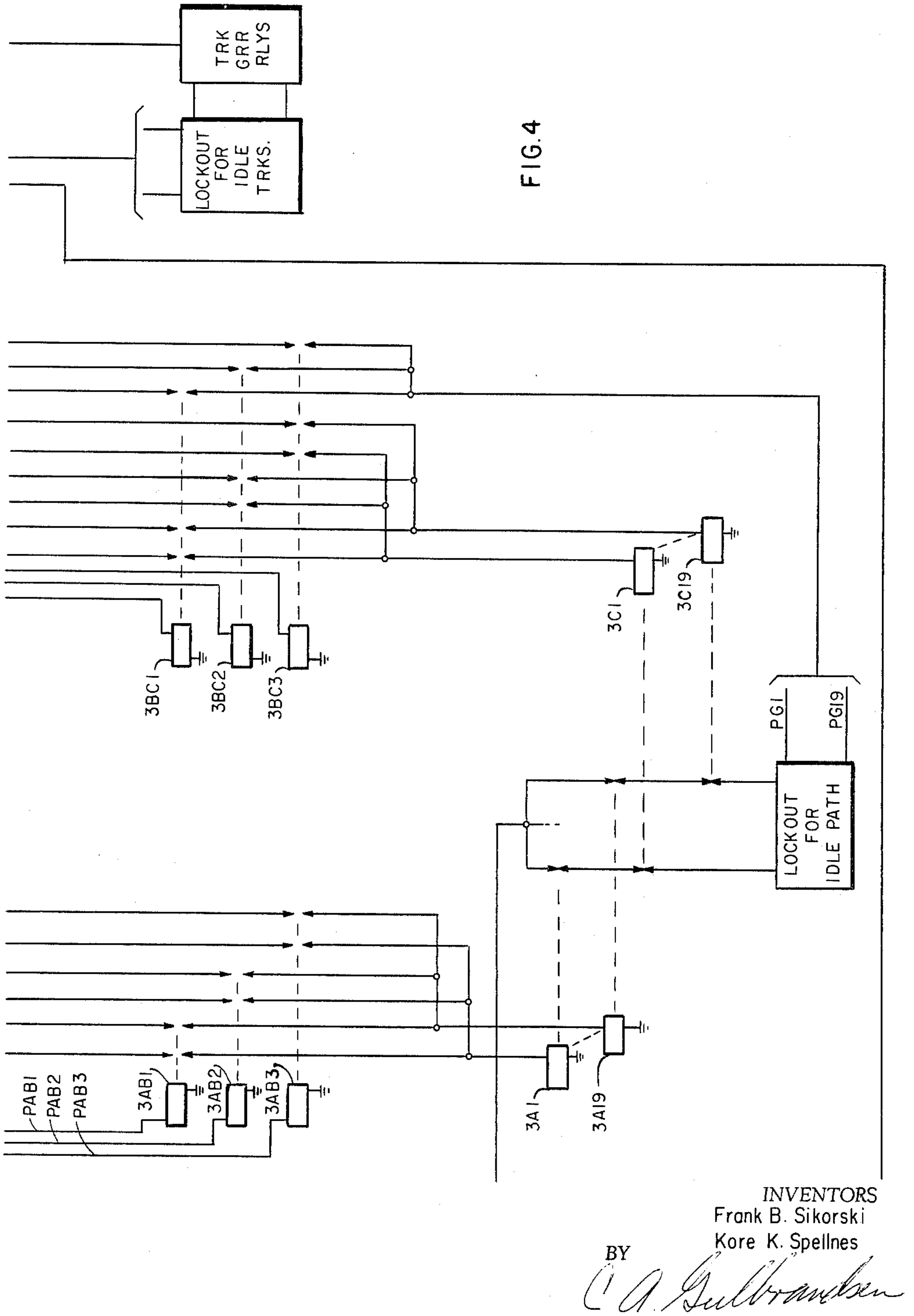
Figure 8:
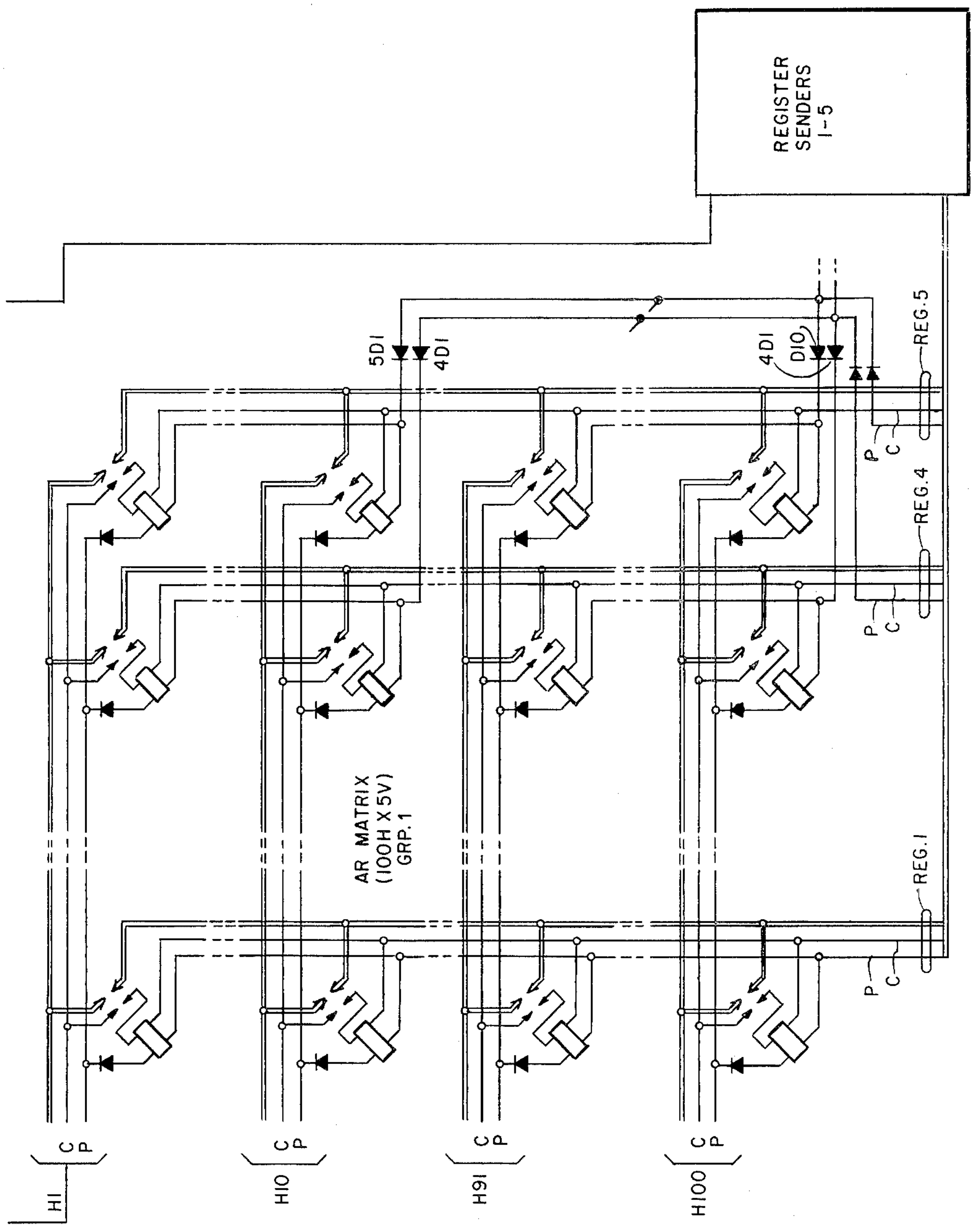
Figure 9:
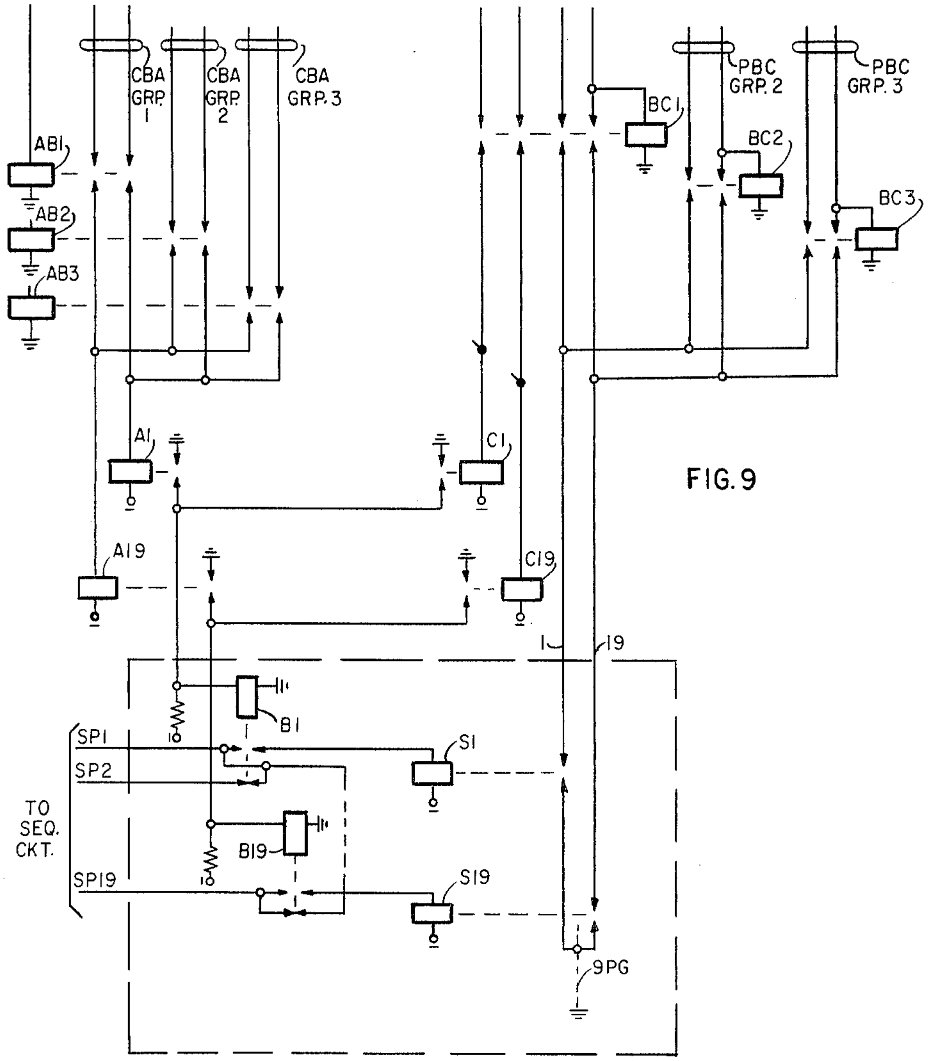
Figure 10:
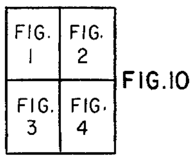
FIG. 10 shows how to combine FIGS. 1–4.
Figure 11:
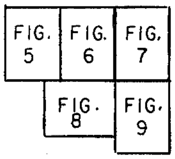
FIG. 11 shows how FIGS. 5–9 should be arranged.

A sequence circuit 3SC is provided to serve both the originating 30M and terminating marker of FIG. 4 or FIG. 8. In the case of the originating marker, the sequence circuit enables the line-identity circuit to provide equal service to each line or trunk in the office. It also provides sequence control to the register-selection circuit in order to distribute traffic evenly among the available registers.

THE REGISTER-SENDER

Broadband offices are not large in terms of line and trunk quantities. In order to achieve reasonable efficiency, it is necessary to arrange the register-senders in a pool accessible to all inlets. Some lines have subsets with touch-tone signalling, while others have subsets with dial calling devices. Trunks generally employ multi-frequency pulsing, but some may use dial pulsing. The register-sender must return dial tone to lines, stop-go supervision to trunks, and must be able to understand the addressing language of any of the inlets.

The pulsing transmitters of touch-tone subsets are muted until enabled by a distinctive tone from the register-sender. In this manner it is practicable for the touch-tone subsets to use standard multi-frequency pulsing, as used by the trunks except without the start and stop signals.

Addresses used in the broadband switching system may consist of 1, 3, 7, or 10 digits, not counting the sometime start and stop. The register-sender must also recognize and give a special response to the receipt of too many digits. Accordingly, a digit appended to a 3, 7, or 10-digit address will cause the register-sender to call for "trouble translation," provided the supernumerary is received before final routing has been made. However, it was thought proper for the register not to concern itself about extra digits when "0" operator code is received as a first digit.

Excepting the operator code, the register-sender does not have the innate ability to analyze the code received to determine the number of digits properly to be expected. It calls upon the common translator for this service—termed pre-translation—when three digits are in hand. The pre-translation results also enables the register to select the proper course of subsequent action, as will be discussed later.

*Register-sender seizure and inpulsing*

Initial seizure of the register-sender is under control of the originating marker. A three-digit inlet identification number and the trunk or line, multi-frequency or dial pulse classifications are received over a set of common leads. The register-sender checks the inlet equipment number for two-out-of-five parity, verifies receipt of classing information and appropriately sets and verifies the starting position of the address in-sequencing switch. The connection of the register-sender is then established to the calling inlet via the AR crosspoint matrix of correeds (reed relays). One of the conductors is a "pull" lead to the inlet end of the main switching matrix through the line circuit and is marked as lead 5PLA on FIG. 5. This is a unique feature of the broadband switching system; a direct and immediate access to the inlet is thereby available to the terminating marker for the setting up of a connection to a called outlet.

On a multi-frequency class calling line, the register-sender closes the inlet transmit pair into the associated multi-frequency receiver. The receiver has a constant-level input amplifier and the necessary filters and channel amplifiers to drive a single-make correed for each of the six signalling tones. Receipt of the KP signal is expected on trunk class calls; timing and verification of KP is performed by the register-sender. The receiver correeds operate corresponding digit storage relays via an in-sequencing rotary switch in the register-sender.

The same in-sequencing switch is used on dial pulse class lines, but in this case a hook switch supervisory relay follows the dial pulses, while a conventional slow-releasing slave relay holds. The pulses are fed to a three-relay driver of a reflexed counting chain of relays. The driver relays also actuate a "C function" relay which recognizes the interdigital pauses between trains of pulses. The same driver and counting chain is used in dial out-pulsing, thus precluding the possibility of simultaneous in and out pulsing. This economy in circuitry is permissible because of the relatively low usage of the dial pulse mode, particularly for out-pulsing. Terminating calls, of course, do not require out-pulsing.

*Pre-translation*

As previously stated, the register-sender will call for pre-translation upon the registration of three digits of address. Exclusive connection to the common translator is made through the action of a translator assigner, which is an all-relay circuit providing full gate-lock out action. A requesting register-sender has an individual lead to the translator assigner which is marked through a ground-connected relay winding. Resistance battery sufficient to operate this "connect" relay is returned to the assigned register-sender. Slave relays connect the register-sender to a group of common leads for rapid transfer of information to and from the common translator. Upon receipt of a ground on a translator ready lead, the register-sender extends markings corresponding to the first three address digits and a pre-translation mark to the translator. The pre-translation result, together with information obtained earlier from the originating marker, govern the next course of action as outlined below for the various cases.

*Abbreviated number dialing*

A pre-translation which results in receipt of the abbreviated number dialing mark, informs the register-sender that three digits constitute a complete address, with the first digit representing the requested band-width and the next two digits representing the called station in the callers' repertoire. The register-sender withdraws the pre-translation mark, prepares for the later receipt of a reconstituted normal address, and awaits the translator ready signal. The 3-digit equipment number (inlet identification), requested bandwidth digit, and the equipment number mark are next presented. A classing complete response indicates that the requested bandwidth is within the caller's capability and that the register-sender should proceed with the next presentation. Upon again receiving the translator ready signal, the 2-digit abbreviated number, bandwidth digit, and abbreviated number mark are presented. At this point the translator supplies the reconstituted address to the register-sender storage and such special outpulsing instruction (routing prefix, deletion, code conversion) as may be required.

The next signal in the normal sequence terminates the translation phase of the register-sender's activity. This is a "pull complete" signal from the terminating marker, indicating that an outlet has been selected and that a connection has been established from inlet to outlet through the switching matrix. One more transaction with the translator precedes this when it turns out that the call is to a local station. In this case a local mark is received from abbreviated number translation, which causes the register-sender to present the terminal portion (last three digits) of the reconstituted address along with the requested bandwidth and the terminal number translation mark.

*Seven-digit call to distant office*

The pre-translation result in this case is the receipt of the distant office mark. The register-sender discerns therefrom that seven digits constitute a complete address and that the bandwidth request should appear as the fourth digit. If this is a line-originated call, the register-sender relinquishes the translator to return again after seven digits are in hand.

If this is a multi-frequency in-pulsing call from a trunk (tandem switch), final translation can be made upon receipt of the requested bandwidth. This, the fourth digit, will normally be in hand by the time pre-translation is completed. In this event the "come back later" operation is by-passed, and the code translation presentation of the three office code digits plus bandwith follows. Special sending instructions, if any, are returned by the translator followed by a "pull complete" mark from the terminating marker.

Returning to the line-originated case, the register-sender again calls for the translator upon the registration of the seventh digit. The next presentation to the translator consists of the three-digit inlet equipment number, the bandwith digit, and the equipment number translation mark. The translator classes the calling inlet with regard to bandwith capability, makes a comparison with the requested bandwith, and (if acceptable) responds with the classing complete signal. The register-sender then makes the presentation for code translation, the joint operations of the translator and completing marker follow, and a pull complete signal is received.

*Ten-digit call to a foreign system*

The pre-translation result in this case is a special mark. This means that ten digits are required for a complete address, and that there is no bandwidth request as such included in the address. The register-sender assumes a 4 kc. bandwidth requirement, and supplies the appropriate digit in its subsequent transactions with the translator. With either line or trunk originating class, the register-sender relinquishes the translator to return again after ten digits are in hand.

With a line class the equipment number and code translations follow, and a pull complete signal is received in the normal course of events. As in the previous cases, the equipment number translation cycle is omitted on calls of the trunk originating class.

*Seven-digit locally terminating call*

The pre-translation result in this case is the local mark. This indicates that the register-sender is to relinquish the translator and return after seven digits are in hand. In the local case the bandwidth digit is the fourth digit of the address. The terminal number translation (fifth, sixth, and seventh digits, and bandwidth) is required instead of code translation. On line class, equipment number translation precedes terminal number translation.

*"Pull complete" signals*

The assigned register-sender will receive a signal from the terminating marker when connection to an output has been established. Any of four different pull complete signal leads may be used. A multi-frequency lead indicates that multi-frequency outpulsing is required. A dial pulsing lead is the dial pulsing indicator, and a no pulsing lead is the regular "no outpulsing" indication. A release lead has special usage as a "no outpulsing" indicator (described below). It also may be marked by either the terminating marker or the translator as a overriding control to force the register-sender to withdraw and release.

*Transfer of information to a ticketer*

Each line accessible path through the multistage switching matrix has a ticketer 2T1–2T19 or 6T1–6T19 associated with it before the second stage. A line originating class conditions the register-sender to expect a request from a ticketer for transfer of ticket data, in addition to a regular pull complete signal, before relinquishing the translator. The data request causes the register-sender to connect to a set of common leads for rapid transfer of the 7- or 10-digit address, 3-digit inlet identification (equipment number), a class digit and a register-sender identification digit.

In some cases the terminating marker may connect the inlet to a recorder tone outlet using only the first stage of the switching matrix. Here the terminating marker makes use of the release pull complete to satisfy the register-sender, since there will be no ticket data request. There are other instances in which a ticketer is present in the connection, but no ticket is to be made and unanswered call time-out is to be blocked. The ticketer is properly conditioned by a digit transfer complete mark received from the register-sender as a result of its having received no translation mark in the course of translation.

*Code conversion, deletion, and prefixing*

The broadband switching system has only minimal needs for code conversion, deletion, and prefixing. However, the register-sender is prepared to accept special instructions from the translator if a variation from the standard outpulsing pattern is required. Provision is made for the following variations:

(1) Delete first three digits of 7-digit number, substitute converted code supplied by translator.

(2) Delete first three digits of 10-digit number.

(3) Delete entire address, send 3-digit routing supplied by translator.

*Outpulsing*

The pulse multi-frequency or pulse dial pulse signals from the terminating marker at the pull complete cause the register-sender to relinquish the translator and to prepare for outpulsing. A "wait" signal (off hook supervision) is usually encountered. Outpulsing commences after a "go" signal (on hook) is received. During any interdigital interval a stop-send (off-hook) signal may be accepted. However, the present system will use the "wait" but not the "stop" signal.

Outpulsing in the multi-frequency mode provides the KP (start) signal, digit outpulsing at seven per second (½ interval tone on), and the ST (stop) signal. Dial pulsing is at 10 pulses per second with interdigital intervals of 640 milliseconds.

With dial outpulsing a check is made to detect an overrun (train of 11 pulses). With either mode of outpulsing, each stored digit to be outpulsed is checked for two-out-of-five parity. In the event of a fault of either nature, the register-sender takes the following action:

(1) On trunk originated class, the trunk is signalled to drop the set up connection and return the built in reorder tone to the calling end. A sending fault peg count pulse is generated and the register-sender releases itself without extending a transmission cut-through mark to the trunk.

(2) Line circuits do not have a built-in recorder tone facility. On line class the register-sender extends a transmission cut-through mark to the line, releases, normally, except for the omission of a transmitter enabling tone, and generates a sending fault peg count pulse. "Partial dial" time-out within a few seconds in the next office will cause a tone to be returned to the caller.

The register-sender will release itself at the normal completion of outpulsing. On line class calls the transmitter, enabling tone will be extended, then the transmission cut-through signal is extended just prior to release of the register-sender. On trunk class calls the sequence of events is the same except for omission of the enabling tone.

*48 kc. bandwidth request*

Calling stations with 48 kc. bandwidth capability also have a separate order wire with a bandwidth capability up to 16 kc. If 48 kc. bandwidth is requested, the translation will include a special mark. The register-sender then applies a special marking to the transmission cut-through lead calling for combing the order wire circuit (now cut off at about 4 kc.) and the 48 kc. circuit (12 kc. to 60 kc.) into the same path through the switching matrix.

*Register-sender supervisory timing*

Approximately 10 seconds is allowed for the registration of the first address digit. A line or trunk failing this is disposed of by calling for "trouble translation." Ten seconds is allowed between registrations of succeeding digits. A time-out between succeeding digits (and prior to final translation) also calls for "trouble translation," and in either case a dialing time out peg count pulse ensues. A dialing time-out after final translation causes the register to release itself.

When calling for assignment to the translator, a ten-second interval is allowed. In event of assignment failure, the register-sender calls for automatic transfer to a standby translator assigner. If it is still not assigned within another timed interval. the register-sender releases itself and generates an "assign failure" peg count pulse. A calling line is placed in lock-out until a new call attempt is made. A calling trunk is signalled to return re-order tone.

An allowance of approximately ten seconds is made for a sending "wait" (or stop) signal to clear. If the call is line class originated, the ticketer will have timed out prior to the register-sender in the event of a "wait" signal's failure to clear. The ticketer will cause a re-order tone to be returned to the calling party. The register-sender will extend the transmission cut-through mark, and will release without giving enabling tone. A stop-send time-out peg count pulse is also generated.

All these timing operations are conducted by one timer, which is reset and passed along from one function to another.

*Miscellaneous characteristics*

The register-sender is responsive at all times to hook switch control to insure its release in the event of abandonment.

During the various translation cycles, the register-sender is prepared to accept sending instructions and pull complete signals deviating from the normally expected program. These variations may ensue from translator action upon detection of trouble conditions, or from translator action to deny bandwidth requests which exceed the originating or terminating equipment capabilities.

Upon signal from the translator, the register-sender will connect to the trouble recorder commons for presentation of the originating equipment number and its own identification number. The trouble recorder also has access to the information being exchanged between the translator and register-sender.

The usual provisions are made for alarms and guarding in the event of release failures or blown fuses. A manual busy key and access for pulse testing are also provided.

Facility is provided in the register-sender for abbreviated number dialing of 10 digit addresses.

DISCUSSION

FIG. 3 show the relationship of the translator 3TR to other directly associated components of the broad-band switching system. Critical elements of the translator are provided in duplicate; transfer from one unit to the other is initiated by the translator upon detection of a fault, and a printed record of the fault is recorded by the trouble recorder and monitor, subject to the availability of this unit at the moment of fault detection.

Calls are allotted to the translator 3TR, under control of a translator assigner, upon request for service by one or more of the register circuits. While the translator 3TR may have a number of functions to perform, depending on the type of call being translated, the final result is an instruction to the terminating marker shown in FIG. 4, indicating either a trunk-group selection on outgoing calls or a "pull lead" selection on locally terminating calls. A final "safety valve" is provided in the form of a forced-release control to the register, causing it to clear the translator, if, for any reason, a call should fail to clear through normal or trouble-recording procedures.

*Translator timing features*

Over-all translator holding time (per call) is controlled by a capacitor-timed relay, while interstage translation cycles are timed by a slow-release relay. Alternate translator equipment is placed in operation by the translator transfer control circuit; ground on a lead from this circuit initially operates the capacitor-timed relay which, in turn, operates the slow-release relay removing ground from the assigner and allowing the translator assigner to begin allotting calls to the translator.

A register, upon being assigned to the translator, first passes a class mark, which indicates whether the call was line or trunk originated (with respect to its appearance in this office). Receipt of the class mark in the translator results in the operation of a class relay, transferring the capacitor-timed relay to a charged capacitor, and the slow-release relay to the control of an interstage cycle checking relay. The network of the capacitors and resistors was chosen to provide a release delay for the relay, adequate to allow time for normal call-processing (including trouble recording, when required); similarly, the release time of the slow-release relay is gauged to be sufficient for each interstage translation cycle. The operation of the class relay also closes ground to a translate lead, indicating the translator's readiness to accept a translation attempt from the register. Failure of a translation cycle to verify its required responses results in the release of the slow-release relay; failure to complete all translation functions for a particular call results in the release of the capacitor-timed relay; either situation results in the operation of a trouble relay, which initiates a trouble recording. Under normal conditions, the slow-release relay will be reenergized during the interval between translation cycles, and the capacitor-timed relay will be reenergized and the capacitor recharged during the interval between calls.

*Translation modes*

To provide the utmost capability in the broadband switching system to meet future requirements, an extremely flexible approach has been used in the design of the translator and register circuits. An example of this flexibility is the "pre-translation" of the first three digits dialed, to determine the type of call and total number of digits to be anticipated. This function is performed in the common translator, eliminating the need for type-of-code detecting facilities in the individual registers, and permitting convenient adaptability to changes in numbering plans and service features. To perform all of its various translating functions, the translator operates in seven different modes:

(1) Pre-translation.
(2) Equipment Number.
(3) Code Translation.
(4) Terminal Number.
(5) Abbreviated Number.
(6) Assistance Operator.
(7) Trouble Translation.

Each of these modes are described briefly.

*Pre-translation*

The translator consists primarily of a decoding-relay "tree," used to expand a coded input from the registers into a one-, two, or three-wire output for the various modes of translation. In particular, where a single-wire output per code is used. Use of the "tree" for other modes is accomplished by activating the appropriate output stages under instructions received from the register, along with the coded input, on each interstage translation cycle. When a register has received three digits (and provided the first digit is not "0") it makes a request for assignment to the translator. After being assigned, passing a class mark, and receiving the "translator ready" indication as previously discussed, it presents those three digits in "two-out-of-five" coded form, along with a pre-translation request, to the translator. Decoders convert the coded digits to decimal form, and the relay tree expands the separate decimal outputs to a specific "one-out-of-nine-hundred" marking—the "0" hundred-group being, of course, excluded.

Output leads from the pre-translation output stage are grouped according to type-of-code classifications, and cross-connected to corresponding identification leads to the register—or internally to the translator control. To meet present requirements for the broadband switching system the following type-of-code classifications are made:

(1) Numbering Plan Area codes.
(2) Distant (Broadband) Office codes.
(3) Local (Broadband) Office codes.
(4) Abbreviated Number Address codes.
(5) Vacant codes.
(6) Test board "101" code.

Each stage of the decoding-relay "tree" has a checking lead to verify "two-out-of-five" decoding and decimal relay responses. Also, in the pre-translation mode, path continuity through the tree is verified by means of a series supervisory relay at the apex of the pre-translation tree. Failure at any of these checking points results in a trouble-recording attempt, showing the fault condition indicated by the status of the checking relays.

Subsequent events are governed by the particular pre-translation response received. In case of Numbering Plan Area codes and distant or local office codes, the register will usually withdraw from the translator and wait for additional digits; however, if it has meanwhile received sufficient digits it may proceed immediately to the next translation stage. A pre-translation response indicating an abbreviated number address code shows that all digits have been dialed, and the register advances to the next translation stage without delay.

Vacant codes, or the testboard code "1", result in an immediate routing instruction to the terminating marker; the register withdraws from the translator when the calling circuit has been extended through the matrix to the testboard or to a recorded message announcer or re-order tone, as appropriate. Vacant codes on calls classed as coming from inter-office trunk circuits are recognized as faulty sending from the distant office, and are therefore trouble-recorded before being routed to re-order tone or recorded message.

*Equipment number translation*

All line originated calls (except calls to "operator") require an equipment-number translation, to determine the following three factors about the calling line:

(1) Bandwidth rating.
(2) Class of service.
(3) Abbreviated number dialing group.

It is in connection with the equipment number translations, then, that the full three-wire output capacity of the translator decoding relay tree is used.

On abbreviated number dialed calls the bandwidth request digit is the first digit dialed and is followed by a two-digit address code; on regular broadband calls the bandwidth request digit is the fourth digit, following the three-digit office code. When the register has received the required number of digits, as determined by the pre-translation result, it initiates the equipment number translation, by presenting to the translator the three-digit line number which it received from the originating marker, the bandwidth request digit dialed by the caller, and an equipment number translation request mark. This causes the translator to activate the equipment number output stages of the relay tree. The first output for the particular equipment number code presented is used to mark the maximum bandwidth to which that line is entitled; the second output to select a class of service; and the third output to identitfy the abbreviated number dialing group, if any, to which the calling line is assigned.

The method used for checking the bandwidth requested against the bandwidth rating of the calling line consists of a crosspoint comparison of the two indicators. Requests (caused by dialing errors) for unassigned bandwidths, and other requests that must be denied, result in routing to a recorded message announcer or to re-order tone. Attempts at abbreviated number dialing where the calling line is not entitled to such service result in a trouble recording, to facilitate checking out mischievous dialing.

As in the case of pre-translations, relay response and "tree" continuity checks are made with similar provisions for pinpointing trouble locations and making trouble recordings. When all required equipment number responses have been verified, the register is signalled, by means of a "classing completed" mark, to advance to the next interstage translation cycle.

*Code translation*

On fully dialed, outgoing, line originated calls, the code translation follows the equipment number translation. On trunk class through calls, it is the next cycle following the pre-translation. It is, in effect, the routing translation giving routing instructions to the terminating marker, taking into account the dialed office or numbering plan area code, the requested bandwidth and the class of service on line originated calls.

At the translator decoding-relay tree, the code translation uses a 900-lead output stage similar to the one used for pre-translations, but with its output leads arranged for jumpering through the bandwidth selection, class of service, alternate route, and code conversion cross-connecting fields.

For the code translation, the register again presents the first three digits of the dialed number (which are now known to be either an office code or a numbering plan area code) plus the bandwidth request digit and a request for code translation. On inter-system calls, involving numbering plan area codes, the subscriber has no option to select a bandwidth digit; hence, the register is arranged to furnish automatically a voice-band request digit for such calls both on the equipment number and on code translations. The bandwidth request digit on code translations selects the proper bandwidth "gate" to cause an appropriate routing choice to be made for the bandwidth requested. The present broadband switching system calls for the use of ½, full, 2X, 4X, and 12X voice-band circuits.

The translators will initially provide for ten classes of service; the means used for obtaining class of service marking places no limit on the number possible. Alternate routing is accomplished by route-switching relays which monitor their respective trunk groups for all-trunks-busy conditions. Inasmuch as tandem routing situations often result in common inter-office trunk groups handling both terminating and through calls that require distinctive alternate routing, each alternate route relay is arranged to transfer up to three different routing instruction leads, individually, when an all-trunks-busy condition occurs. Provision has been made for the terminating marker to request a re-translation, if, for any reason, it cannot find an available trunk in the first routing instruction it receives. This provides protection against last trunk seizures from a distant office simultaneously with trunk group selection by the local translator. Code conversion and sending deletion control facilities have been arranged for use as requirements may dictate. The registers are arranged to receive up to three code conversion digits, which could be used either as prefix or a conversion digits in conjunction with available deletion controls. On code translations, relay responses in the transistor decoding relay tree are checked as usual, but path continuity is verified by the terminating marker, through its check for a routing instruction.

*Terminal number translation*

On all locally terminating calls, the broadband switching system translator performs a terminal number translation for the purpose of determining the following two factors, from the called station number:

(1) Bandwidth rating
(2) "Pull lead" selection

The first output of the translator decoding-relay tree, here is used to mark maximum bandwidth which would be completed to the called line, while the second output is used to select the "pull lead" of the called line. On terminal number translations, apex control of the "pull lead" selection tree is transferred to the terminating marker, where it applies the necessary potential to complete a call through the switching matrix. The translator also provides a cross connect field for terminal number hunting groups; these may have up to twenty lines per group, and individual lines within a group need not be assigned terminal numbers in any predetermined order. For the purpose of the terminal number translation, the register presents the last three digits of the locally terminating called number (representing the terminal number of the called line) together with the immediately preceding bandwidth request digit and a request for a terminal number translation.

The bandwidth checking facility is again used for checking the bandwidth requested against the bandwidth rating—this time, of the called line. As in the case of bandwidth checks against originating lines, "denied bandwidth" requests on terminating calls result in a routing to reorder tone or a recorded message announcer.

The translator is made available for another call when the register withdraws all of its markings to the translator upon completion of a matrix connection to the called line, busy tone, reorder tone, or recorded message announcer, as appropriate, under control of the terminating marker.

*Abbreviated number translation*

On abbreviated number dialed calls, the complete translaiton sequence involves three interstage translation cycles on outgoing calls, or four cycles on locally terminating calls. In either case the first three cycles are alike; the terminal number translation cycle just described is added on locally terminating calls. As described previously, a pre-translation response indicating an abbreviated number address code causes the register to advance next to the equipment number translation. A satisfactory check of the requested bandwidth, and identification of the calling line's class of service and abbreviated number dialing group allows the register to advance to the abbreviated number translation cycle. For the purpose of the abbreviated number translation, the addres code is treated as consisting of a bandwidth request digit followed by a two-digit abbreviated address number. The bandwidth request digit is presented to its usual decoder in the translator, for the purpose of selecting a bandwidth gate in the event that the abbreviated address results in an outgoing call, while the abbreviated address digits are presented to the second and third decoders of the translator decoding-relay tree.

The abbreviated number translation request mark causes the translator to activate output stages for the first and second paths through the decoding-relay tree. Each path is arranged for 80 outputs, corresponding to the 80 available abbreviated address codes. These outputs are directly wired to the individual abbreviated number dialing subscriber group gates, which give access to translator relays for reconstructing each particular abbreviated number address code, for each subscriber group, into its broadband switching system directory number.

The abbreviated number translators are divided into two pools—one providing the office code portion and the other the terminal number portion of the reconstructed directory number. The translator relays are arranged to provide this reconstructed directory number directly to the assigned register; an addition, the bandwidth request digit is repeated to the register in its appropriate location in the reconstructed number. On outgoing calls, the route selecting lead is derived from the office code translator relay. This is, in effect, a simulation of the code translation lead that would have been derived from the directory number office code had the call been fully dialed. Bandwidth selection, class of service, alternate route, and code conversion treatments are all available on abbreviated number dialed calls in the same manner as on fully dialed calls. The terminating marker also has its re-translation request privilege on the first routing attempt.

Where the reconstructed office code turns out to be that of a local office, the translator signals the register to make a terminal number translation, based on the reconstructed directory number furnished. The terminal number translation, involving bandwidth checking and pull lead selection of the called line, is made as previously described.

*Assistance operator translation*

Calls to the assistance operator are placed by dialing "0." They are the only type of call which is explicitly recognized by the register. Upon receipt of an "0" type call the register signals the translator for the assistance operator routing, after the usual request and assignment sequence. The translator verifies that the "0" request is from a line classed call, and it marks the assistance operator routing instruction lead to the terminating marker. A "0" request from a trunk classed call would be treated as a sending error from a distant office and would result in a trouble recording attempt followed by a re-order tone.

*Trouble translation*

The register is arranged to recognize certain dialing irregularities, such as too slow dialing, "permanents," and others; for each it requests a trouble translation. On line classed calls the translator routes such calls to a "permanent" holding circuit from which a distinctive tone may be applied, followed by line lockout. For trunk classed calls the trouble translation is treated as a sending fault from a distant office, it results in a trouble recording attempt followed by a re-order tone.

*Terminating marker*

In conjunction with the translator, the terminating marker performs the following functions:

(1) Performs busy-idle test if termination is line.
(2) Selects idle line in PBX group.
(3) Selects idle trunk if call is for distant termination.
(4) Selects idle path through matrix.
(5) Closes pull potential and checks for the hold condition.
(6) Controls register ticketer common highway.

Since the translator contains a tree for determining the class of the called line, rather than provide a similar tree in the marker, it was more economical to expand this tree to include the line pull leads needed by this marker. On a call that terminates on a line within the office, the translator closes the apex of this tree through to the marker, to allow it to perform an idle-busy test and to complete the pull function. If the line is busy, the marker operates the 60 IPM route relay in order to connect the calling line through to an idle 60 IPM tone source. If the line is idle, the marker proceeds to the path selection stage which is described later.

The marker is arranged to hunt for an idle PBX line when a pilot number is dialed. This PBX group does not have to be consecutively numbered, and the lines may be spread through the various "A" matrix stage groups. Each line in the group except the pilot number may be dialed directly, because the lines have an appearance on the translator tree as well as on the PBX group relay in the marker. When a pilot number is dialed, the marker performs an idle-busy test on a maximum of 20 PBX lines. In the case of PBX lines with 48 kc. capabilities, an extra lead is brought from each line to the marker, to allow control of the filters in the line circuit.

The translator determines the trunk route to be used on a particular call from the dialed office code. It contains the trunk group all trunks busy relays and will perform the alternate route function. Each trunk-route relay provides access to 20 or less trunks. A correed relay chain allows hunting of an idle trunk in a minimum time interval. As two-way trunks are used throughout the network, it will be possible for all idle trunks in the group to have become busy after the translator has given the route identification to the marker. The all trunks busy leads of each trunk group are cabled to the marker, to allow it to determine if this condition exists and to request the translator for an alternate route. If an all trunks busy condition exists on a trunk route, which is a single route, or if on a retranslate condition an idle trunk is not found, the calling party is routed to a recorder tone via the 20th outlet of the "A" matrix stage. The sequence-control circuit provides a varying trunk preference to provide even traffic distribution among a group of trunks. When an idle trunk has been found, it is made busy to turn down the distant end, and the marker proceeds with the path selection phase of its operation.

The path selector section shown in FIGS. 4 or 8 of the marker functions to find an idle path between the calling line or trunk circuit and the called line or trunk. As a three-stage matrix is used, it is necessary for the market to determine the "A" stage group that the originating line is located in, and the "C" stage that contains the terminating line. A potential applied to the pull leads operates the required stage-connect relays. The marker then determines both the designated "A" and "C" stages. As the trunk stage of the office is non-blocking, failure to find an idle path on a truck-to-trunk call indicates a trouble condition. However, on line-to-trunk calls or trunk-to-line calls, failure to find an idle path does not necessarily indicate a fault condition.

The marker sequence control section controls the remainder of the market operation. When an idle path is found, the pull potential is applied to the matrix. When the pull potential is removed, the matrix connection is checked to determine if the matrix relays hold operated. It is necessary to perform this function for both trouble recording purposes and for avoiding a collision on the two-way trunks as it is possible for such a trunk to be seized simultaneously from both ends. In case of a collision, the connection cannot be established to the outgoing trunk and the call is routed to overflow busy tone.

Upon seizure of this circuit from the translator a relay operates to close one of the group relays 4AB1, 4AB2 or 4AB3 via one of the leads PAB1, PAB2, or PAB3 of the "A" stage matrix and one of the line group relays 4BC1, 4BC2 or 4BC3 via one of the pull leads 2PBC1, 2PBC2 or 2PBC3 of the "C" stage matrix. If, as shown on FIGS. 5–9, group one of both the "A" and "C" matrix are associated with local lines, then relays 9AB1 and 9BC1 have their circuits closed. Relay 9AB1 operates and closes the first group's "C" leads of the "A" stage of the matrix to relays 9A1–9A19. Relay 9BC1 operates and closes the first groups "PBC" leads to the "C" stage of the matrix to relays 9C1–9C19. The 9A1–9A19 and the 9C1–9C19 relays associated with busy paths operate and short circuit the 9B1–9B19 relays associated with their respective paths. Another connect relay (not shown) operates and closes the circuits to the 9B1–9B19 relays associated with idle paths. Ground from the sequence control circuit via the chain contacts of the 9B1–9B19 relays closes one of the 9S1–9S19 relays corresponding to the first operated 9B1–9B19 relay encountered. The 9S1 relay operates, for example, locks, opens the circuit to the connect relay and effects the grounding of the number 1 "PBC" lead to the "C" stage of the line matrix via lead 9PG to "pull" the correeds of the line matrices corresponding to the chosen path, via a lead through the translator, the line circuit, the correed of the "C" matrix and back to lead PBC. A relay operates, via ground on lead 5PLA through the register, the "AR" matrix, the line circuit through the "A" and "B" matrices and back to lead PBC of the marker. When the "pull" is thus completed, the A1 and C1 relays, corresponding to the path chosen, operate and cause the removal of ground from lead 9PG and hence, the "PBC" lead to the "C" matrix, restores and opens the operate circuits to the 9A1–9A19 relays. Relays 9A1–9A19 restore.

On a call originated by a line, it is necessary to connect the register serving the call to the ticketer assigned to the call via a common highway to allow the required information to be given to the ticketer for billing the call. The marker maintains control of this common highway and will force release of a ticketer or register that fails to disconnect from the common highway. In addition, the monitoring of the highway allows the marker to print a trouble record if a ticketer fails to connect to this highway as a continuous ticketer failure would result in a loss of revenue due to lack of a ticketer on the call.

Upon completion of the ticketing function, the marker expects to be released by the register. If the release is not received, the marker will force-release the ticketer and free itself for other calls.

The marker-sequence control circuit contains the trouble recording features required to pinpoint the exact nature of a trouble condition. It is able to do this by continuously following the progress of the other section of the marker. It also furnishes information to the automatic monitor circuit, to enable it to determine what equipment is serving the call that is being monitored.

The marker common start circuit provides the transfer function required to alternate markers. It also contains timing equipment to serve as a back-up of the alarm features included in the marker sequence control circuit, so that if a marker fails to react to a start signal, the call can be transferred to the other marker. It also monitors the fusing of each marker, so that a fuse failure will automatically transfer the call to another marker.

Automatic ticketing in the broadband switching system involves some new approaches from the "rate" point of view and the circuit techniques used to meet the requirements of this new communication system. These requirements include that every call from one subscriber to another be a ticketed call; that the minimum element of time for which a call can be charged is six seconds; and that rate structure is based on distance, time and bandwidth requested. The circuitry is based on operation in a four-wire common control system with a three-stage matrix as the switchboard.

The ticketer such as 2T1–2T19 is located between the "A" stage of the matrix associated only with lines and the "B" stage of the matrix. This places a ticketer in every call that is originated at the originating office only. Inter-office calls do not require the service of a ticketer in the terminating office or in tandem office, which merely pass on the call from the originating office to the terminating office.

The ticketer is called the basic unit of the ticketing circuitry because it collects the basic information for billing the call. This includes the following:

| | digits |
|---|---|
| (a) Calling (equipment number) | 3 |
| (b) Called number | 7 or 10 |
| (c) Bandwidth requested | 1 |
| (d) Time the called station answered | 7 |
| (e) Time the call was terminated | 7 |

At the termination of each call, the ticketer passes this information on to a tabulator which is used to re-arrange this information in the order best suited for processing by various business machines or manually. The re-arranged call information is then passed on sequentially, to a tape perforator. This tape is then used by the business machine or tape to print machine for preparing the final billing.

In addition to collecting the information listed above, the ticketer performs other functions as a result of its location in the switchboard. As described the matrix consists of six-wire crosspoints; four are used for transmission, one for holding ("C" lead) and sixth conductor (the "EC" lead) is used for supervision. The ticketer is primarily concerned with the "C" and "EC" leads. The ticketer is seized when the terminating marker closes a path from an originating line to a terminating line or outgoing trunk. This function is performed by the "C" lead control. The supervisory functions such as stop-sending, continue to send, called station off-hook and called station on-hook are performed by the "EC" lead control.

The ticketer does not require the first two supervisory signals (stop-send and continue to send) for ticketing purposes, but merely repeats them to the associated sender when an outgoing trunk is seized. However, should a stop-sending signal persist for six to nine seconds, the ticketer releases the connection forward by opening the "C" lead forward and returns a call trunk busy tone to the calling subscriber, and then releases.

When the ticketer is first seized, the ticketer receives the calling number, class, register number, called number and bandwidth requested, from the register-sender via a common highway. Since the terminating marker closes one and only one path through the matrix at any given time, this feature is used to associate the register-sender with the ticketer selected for transfer of all information between the register-sender and ticketer.

When the called station answers, the ticketer is notified via the "EC" lead. At that instant the ticketer "looks at the clock" by momentarily closing its memory to a common highway to the chronopher in the block 2CE. During this short interval (less than 100 MS) the ticketer receives the date, time (hour, minutes and tenth of minutes) and rate (day, night or late night). While the call is in progress or any time prior to connecting to a tabulator, the ticketer is ready to receive a "month transition mark" from the chronopher.

When the call is terminated the ticketer again looks at the clock by momentarily closing another area of its memory to the chronopher common highway, and the date and time are again recorded. With the call data required for billing in storage, the ticketer calls for a tabulator and associated perforator.

The tabulators are in a common pool of common equipment 2CE, permitting any one of ten tabulators to serve any one of one hundred ticketers. The assignment of tabulators is on a one-at-a-time basis and is supervised by a common allotter circuit. When a ticketer calls for a tabulator, the common allotter circuit gives a start signal to a preselected tabulator and causes a common highway to close between the selected ticketer and tabulator and between the tabulator and the chronopher. All call data plus the ticketer identity number and register-sender number are passed from the ticketer to the tabulator. The tabulator also closes to the chronopher and obtains the current month and previous month from the chronopher 2CE.

After passing call data to the tabulator in 2CE, the ticketer clears its memory and makes itself available for another call. The tabulator spills all information obtained from the ticketer and chronopher to the perforator also in 2CE. This spill will include the month, day, and time that the call was originated and terminated in, plus calling equipment number, called number, bandwidth used, class, rate, register-sender number, ticketer number and tabulator number.

As the tabulator spills to the perforator it checks each digit for two-out-of-five code. If an error exists, an alarm is sounded and a lamp lights to indicate the trouble. The error is printed on the tape, however, at the end of the spill, the tabulator adds a mark to indicate that there is an error in the call data. In reading the tape, this mark will make it possible to sort these calls for analysis of the fault.

CONNECTOR CIRCUIT

The connector circuit is used between the "B" and "C" stages of the line matrix on those lines associated only with subscribers lines on terminating calls. Its direct functions are: on seizure, interrupted tone ringing is forwarded to the called station and ringback tone is returned to the calling party; and when the called party answers, the connector forwards a splash of direct ring tone for transmitter enabling. Seizure and connector operation are derived solely from control leads extended through the line matrix units, that is, seizure via the hold lead, and off-hook indication via the extra control lead.

CONCLUSION

The broadband matrix switching system is capable of inter-connecting lines and trunks at a high rate of speed with negligible noise and crosstalk even at very high frequencies. It is versatile and simple in its use of a single basic building block. It is a switching scheme which will fill the needs of the data transmission field.

The features of using the translator for marking the called terminal as well as the other features of the cooperation of the registers, markers and translator are claimed in the copending application of I. V. Coleman, L. L. Smith and W. A. Rust of October 24, 1963, Serial No. 318,646 and assigned to the present assignee.

What is claimed is:

1. In a communication switching system, a plurality of lines including a calling and a called line, a line circuit terminating each said line, a first set of terminals, a second set of terminals, and a third set of terminals, each said line circuit having at least one line termination in said first and third sets of terminals, digital transmitting means at said calling line, a first plurality of switching stages arranged in tandem for selectively electrically connecting terminals of the first set with terminals of the second set, a second single stage coordinate array of relays, all of said stages comprising a plurality of two winding relays arranged in a coordinate array, a unidirectional device individual to each of said relays and connected in series with a first winding thereof, at the coordinate points of each of said arrays, means operated by said calling line circuit to apply a potential to the first winding of an ordinate group of relays in said second coordinate array of relays, other means comprising the connection of a group of said unidirectional devices to a terminal of a second serially poled unidirectional device, said second winding of each said relays connected in series with a normally open set of its own contacts, links interconnecting adjacent stages, a third switching stage between the second and third sets of terminals, a plurality of register-senders, means operated in response to said potential via said second unidirectional device in said second coordinate array of relays to allot an available one of said register-senders, for said register-sender to operate in response to said allotment to apply an opposite potential to said unidirectional device to operate an individual one of said relays of said second coordinate array of relays whereby said register-sender is uniquely connected through said calling line circuit for outpulsing, marker means controlled by said register-sender for applying a first marking potential to a selected terminal of the first set via said second coordinate array of relays and a second marking potential to a selected terminal of the second set which produces a potential difference in the forward direction of said devices between the two selected terminals through a series path including the first windings of one coordinate point relay of each of said stages and a third marking potential of the same polarity as the first marking potential to a selected terminal of the third set, which in conjunction with said second potential causes said relays via said first windings in the path between the selected terminals to operate and thereby establish a communication path, first means operated upon establishment of said communication path for completing a holding circuit in series through the second windings and said series contacts of the relays in the established path, other means effective subsequent to the eslablishment of the holding path for removing said marking potentials.

2. In a switching system according to claim 1, means in said marker means for precluding the interconnection with another line of any already connected line.

3. A switching system according to claim 1, wherein the number of links terminated at any said line-switching group is at least 2A—1, where A is the number of lines served at any line-switching group.

4. In a communication switching system, the combination as claimed in claim 1, further including a plurality of trunk lines including an incoming and an outgoing trunk line, said trunk lines having at least one termination in said first and said third sets of terminals, a second plurality of switching stages corresponding to said first, second and third switching stages for said lines, said second plurality of switching stages having a number of links substantially greater than the number of trunks terminating at said first and third sets of terminals corresponding to said trunks, whereby there is always substantially more than one of the links of the trunk switching stages idle whenever at least one of the trunks terminated thereat remains unconnected.

References Cited by the Examiner

UNITED STATES PATENTS

| | | | |
|---|---|---|---|
| 2,587,817 | 3/1952 | Busch et al. | 179—18 |
| 2,867,690 | 1/1959 | Parks | 179—18 |
| 2,909,611 | 10/1959 | Hutton | 179—18 |
| 2,925,471 | 2/1960 | Licht | 179—18 |

ROBERT H. ROSE, *Primary Examiner.*

H. BOOHER, H. ZELLER, *Assistant Examiners.*